United States Patent [19]
Formosa

[11] Patent Number: 5,825,475
[45] Date of Patent: Oct. 20, 1998

[54] SYSTEM AND METHOD FOR DETERMINING WHICH OF A PLURALITY OF VISUALLY INDISTINGUISHABLE OBJECTS HAVE BEEN MARKED WITH A COVERT INDICATOR

[75] Inventor: Joseph S. Formosa, Hopedale, Mass.

[73] Assignee: Van Leer Metallized Products (USA) Limited, Franklin, Mass.

[21] Appl. No.: 902,035

[22] Filed: Jul. 29, 1997

[51] Int. Cl.$^6$ .............. G06K 9/74; G03H 1/00; B42D 15/00

[52] U.S. Cl. .............. 356/71; 283/86; 359/2; 235/457; 235/494

[58] Field of Search .............. 356/71; 283/86; 359/2; 235/457, 494

[56] References Cited

U.S. PATENT DOCUMENTS

| | | |
|---|---|---|
| 3,894,756 | 7/1975 | Ward . |
| 4,014,602 | 3/1977 | Ruell . |
| 4,140,373 | 2/1979 | Rüll . |
| 4,171,864 | 10/1979 | Jung et al. .............. 283/86 |
| 4,211,918 | 7/1980 | Nyfeler et al. .............. 356/71 |
| 4,400,616 | 8/1983 | Chevillat et al. .............. 235/457 |
| 4,913,858 | 4/1990 | Miekka et al. .............. 264/1.3 |
| 5,037,101 | 8/1991 | McNulty .............. 273/139 |
| 5,291,006 | 3/1994 | Nishiguma et al. .............. 235/457 |
| 5,300,764 | 4/1994 | Hoshino et al. .............. 356/71 |
| 5,379,131 | 1/1995 | Tamazaki .............. 356/71 |
| 5,621,515 | 4/1997 | Hoshino et al. .............. 356/71 |

OTHER PUBLICATIONS

Derwent Information 1996, Abstract No. 96–438470 [44], Japanese J08216577.
Derwent Information 1997, Abstract No. 97–123755 [12], Japanese J09006935.

*Primary Examiner*—Frank G. Font
*Assistant Examiner*—Jason D. Vierra-Eisenberg
*Attorney, Agent, or Firm*—Young & Thompson

[57] ABSTRACT

A system and method for determining which of a plurality of visually indistinguishable objects have been marked with a covert indicator in which a portion of a surface of each of a first type of objects are provided with a covert holographic indicator which is exposed to be viewed but which is detectable only when illuminated with a coherent reference light of predetermined wavelength. The surfaces of objects are scanned with a coherent reference light with the predetermined wavelength, and evaluated to determine whether the scanned surfaces include the covert holographic indicator. The presence of the covert holographic indicator indicates that the object on which the covert holographic indicator is detected is one of the first type of objects. The first type of object may be a winning game ticket, or a genuine, as opposed to counterfeit, article.

23 Claims, 1 Drawing Sheet

SYSTEM AND METHOD FOR DETERMINING WHICH OF A PLURALITY OF VISUALLY INDISTINGUISHABLE OBJECTS HAVE BEEN MARKED WITH A COVERT INDICATOR

BACKGROUND OF THE INVENTION

The present invention relates to imagery methods and systems for detecting valid objects from among valid and invalid objects which have similar appearances, such as tickets in promotional activities and easily copied consumer products. More particularly, the present invention relates to a method and system which uses covert holographic indicators to determine which of a plurality of visually indistinguishable objects has been marked with a covert indicator.

Various activities rely on the verification of the identity of a particular object which is generally visually indistinguishable from other objects of the same type. That is, is the object what it purports to be. For example, in promotions and games, the object may be a ticket which must be evaluated to determine whether it is a winner or a loser, or the object may be a food carton or bottle label which is to be read to determine whether a prize has been won. Or the object may be a product which is easily copied and for which some form of authenticating identification is needed.

In any event, the application of suitable identification verification imagery to the object in question and the verification of the objects identity is desirably inexpensive, easy and reliable. Further, and significantly, the verification imagery is desirably not visible to the unaided human eye. Visible verification imagery could not be used with games cards, and may be easily counterfeited. Accordingly, the verification imagery should be covert so that its message is hidden from unaided view. In some applications it is desirable that the presence of the covert verification imagery be disclosed and in other applications there should be no hint of its presence.

Holography involves the recording and reconstruction of interference patterns. Holographic images are used in a variety of applications, including security devices for identification cards, and in packaging and game cards.

For example, U.S. Pat. No. 5,037,101 issued Aug. 6, 1991 to McNulty discloses the use of holographic image in a game card. However, the image is not covert and must be covered with an opaque cover which is removed by scratching, rubbing or pulling. Covering the image is costly and detracts from the appearance of the game card. Similarly, Japanese Patent 08-216577 discloses a removable cover for a hologram on a lottery ticket.

Examples of covert holographic images are found in U.S. Pat. No. 3,894,756 issued Jul. 15, 1975 to Ward which uses a separate insert formed by a beam scrambler, U.S. Pat. No. 4,140,373 issued Feb. 20, 1979 to Rüll which requires the use of two holographic images, one readable only in coherent visible light and the other readable only in coherent light outside the visible spectrum, and U.S. Pat. No. 4,400,616 issued Aug. 23, 1983 to Chevillat et al. which uses a wave guide hologram.

None of the known references use a covert hologram to verify the identity of a particular object which is generally visually indistinguishable from other objects of the same type, such as game cards, promotional products, and easily copied consumer items.

By way of further background, embossed holograms may be copied in three ways. Contact copying creates a new holographic counterfeit master by using the authentic hologram as a mold. The contact copying technique may be used to 'hard' emboss into materials such as PVC, OPP, polyester, or to 'soft' emboss into a curable resin coating. The 'soft' emboss technique has been particularly adaptable to the counterfeiting of holograms. Embossed holograms may also be copied by recording an illuminated hologram into fresh photoresist, or by recreating the holographic image. These two methods require expensive equipment and talent, and are not often employed to counterfeit holograms.

Accordingly, it is an object of the present invention to provide a novel method and system for determining which of a plurality of visually indistinguishable objects have been marked with a covert indicator.

It is a further object of the present invention to provide a novel method for determining which of a plurality of objects has been marked with a covert indicator in which a portion of a surface of an object is coded with a covert holographic indicator which is exposed to be viewed but which is not visible to the unaided human eye except when illuminated with a coherent reference light with a predetermined wavelength, the portions of the surfaces are scanned with a coherent reference light with the predetermined wavelength, and the scanned portions are thereafter evaluated to determine whether they include the covert holographic indicator.

It is yet a further object of the present invention to provide a novel method for determining which of a plurality of objects has been marked with a covert indicator in which a portion of a surface of an object which is to be coded with a covert holographic indicator is a metallized surface which may include a visible diffraction pattern.

It is another object of the present invention to provide a novel method for identifying a first type of objects from among a plurality of the first and a second type of objects which are generally visually indistinguishable, in which the first type of objects are winning game cards and in which the covert holographic indicators may indicate what has been won.

It is still another object of the present invention to provide a novel method for identifying a first type of objects from among a plurality of the first and a second type of objects which are generally visually indistinguishable, in which the first type of objects are valid and the second type of objects are counterfeit.

These and other objects and advantages of the present invention will be apparent to those of skill in the art from a perusal hereof.

DESCRIPTION OF PREFERRED EMBODIMENTS

Figure 1:
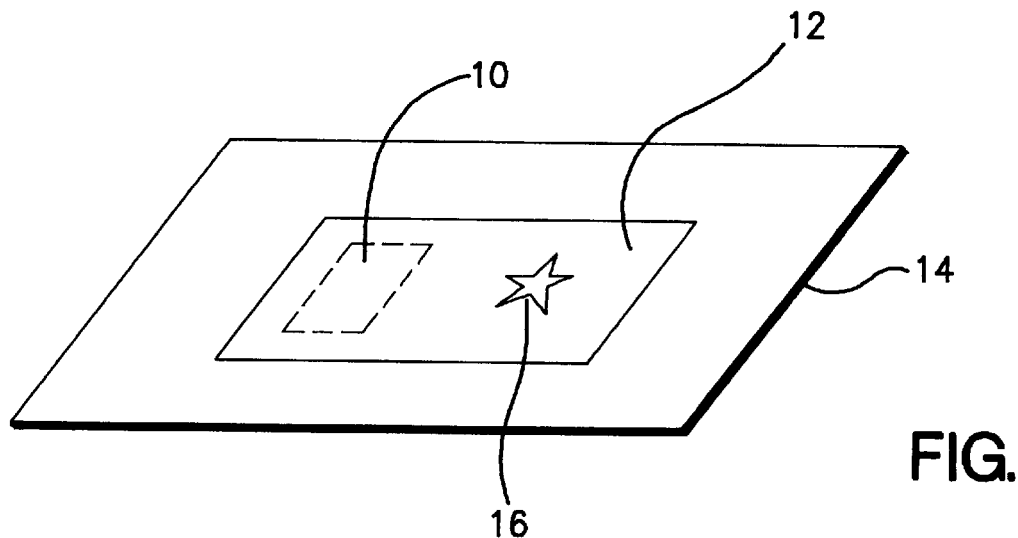
FIG. 1 is a pictorial representation of an embodiment of the present invention.

In an embodiment of the present invention, and with reference to FIG. 1, a hologram 10 is recorded in a substrate 12. Hologram 10 is recorded so that it is not visible to the unaided human eye under normal lighting conditions (such as conventional incandescent or fluorescent light and daylight), and so that a reconstructed image of hologram 10 is only detectable when illuminated with a reference coherent light of predetermined wavelength. Hologram 10 is left uncovered so that it is exposed to view, although as just mentioned it is visible only when properly illuminated.

Substrate 12 is associated with an object 14 which is generally visually indistinguishable from other objects of the same type, such as game tickets or easily copied consumer products. When hologram 10 is recorded in substrate 12, the identity of object 14 with which substrate 12 is associated can be determined by reconstructing (making visible) an image of hologram 10 by scanning the substrate with a coherent reference light of the same predetermined wavelength as was used to record hologram 10. The presence of hologram 10 indicates that the object 14 is authentic, or the reconstructed image of hologram 10 may convey other information such as whether a game card is a winner or a loser. Generally visually indistinguishable objects are those which have the same general appearance and configuration, although they may differ in appearance in some ways, such as serial numbers, color variations, confusingly similar patterns, and the like.

Substrate 12 may be any conventional material in which a hologram can be recorded, and may optionally include a backing of paper or metal and a metallized top surface with a diffraction pattern to enhance visual appeal, as appropriate for the particular application of the invention. For example, substrate 12 may be the coated sheet disclosed in U.S. Pat. No. 4,913,858 issued Apr. 3, 1990 to Miekka et al. To this end, HoloSECURE TM metallized paper from Van Leer Metallized Products (USA) Ltd., of Franklin, Mass. is particularly suitable. Significantly, HoloSECURE metallized paper is particularly resistant to contact copying of holograms embossed therein.

By way of example, a food or beverage promotion may include containers with substrate 12 affixed thereto or part thereof, or the substrate may form the entire container.

Hologram 10 may include text, numbers, pictures, bar codes, etc., as appropriate for the promotion. Hologram 10 may be recorded in some substrates 12, say 1 in 500, to indicate what prize has been won, or hologram 10 may be recorded in all containers and indicate whether the buyer has won or lost. Scanners for reconstructing hologram 10 may be provided at retail outlets or other facilities. Similarly, substrate 12 may be provided on game cards, such as lottery or sweepstakes tickets and promotional cups and labels, and the reconstructed image of hologram 10 may indicate what has been won.

In another application of the present invention, substrate 12 may be affixed to or made part of consumer items to indicate authenticity. For example, substrate 12 may be placed on or in watches, perfume bottles, clothing, or alcoholic beverages, or on labels, containers or hang tags for such items, and hologram 10 may be recorded therein by the manufacturer to indicate that the article is genuine. The reconstructed image of hologram 10 may contain any suitable indicia, such as a digital code, text, serial numbers, pictures, bar codes, trademarks, etc. The content of the reconstructed image of hologram 10 may be kept secret by the manufacturer to further reduce the risk of copying. Scanners at retail outlets or other facilities may evaluate the reconstructed image to determine whether the scanned article is a counterfeit. Obviously, articles without the hologram 10 or articles with an improper hologram 10 would be presumed to be counterfeit.

A holographic image 16 visible under normal lighting conditions may also be recorded in substrate 12 to add interest. Visible image 16 may be on or adjacent covert hologram 10.

Figure 2:
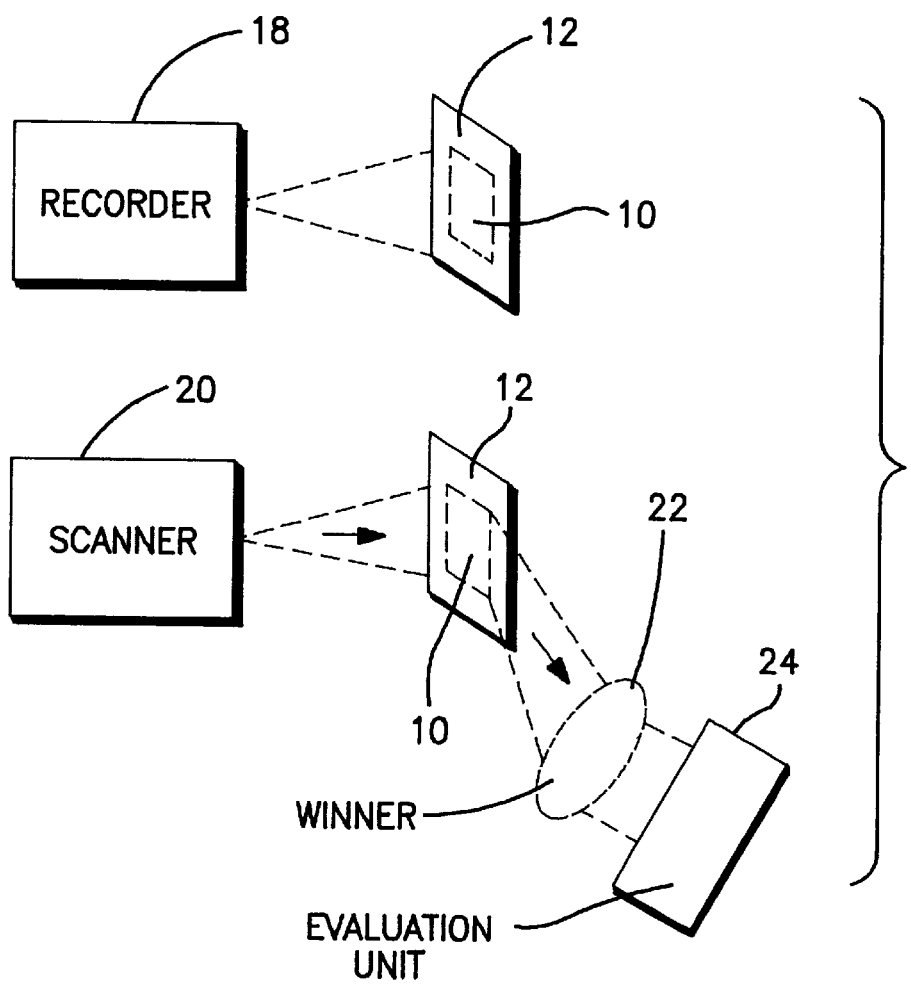
FIG. 2 is a pictorial representation of an embodiment of a system of the present invention.

With reference now to FIG. 2, a system of the present invention may include a conventional holographic recorder 18 for recording hologram 10 in substrate 12. The coherent reference light and predetermined wavelength may be selected so as to be appropriate for the particular application of the invention. For example, the reference light may be a laser. A conventional scanner 20 may be used to provide the reconstructed image 22 of hologram 10. Evaluation of the reconstructed image may be performed visually simply by viewing the projected image, or an evaluation unit (or decoder) 24 may be provided to automatically determine whether the content of the reconstructed image is proper. As shown in FIG. 2, reconstructed image 22 is reflected from substrate 12. The reconstructed image may also be provided by transmission of the coherent reference light through a transparent substrate, such as may be used for a clothing tag or a label for a bottle of clear liquid.

While preferred embodiments of the present invention have been described, it is to be understood that the invention is to be defined by the appended claims when read in light of the specification and accorded their full range of equivalence, with changes and modifications being apparent to those of skill in the art.

What is claimed is:

1. A method for identifying a first type of objects from among a plurality of the first and a second type of objects which are generally visually indistinguishable, the method comprising the steps of:

recording a covert holographic indicator in a portion of a surface of each of a first type of objects, the covert holographic indicator being exposed to view but not being visible to the unaided human eye except when illuminated with a coherent reference light of predetermined wavelength;

scanning surfaces of the first type of objects and of a second type of objects with a coherent reference light of the predetermined wavelength to reconstruct the recorded covert holographic indicator, the second type of objects being generally visually indistinguishable from the first type of objects; and evaluating whether the scanned surfaces include the recorded covert holographic indicator, the presence of the covert holographic indicator indicating that a one of the objects on which the covert holographic indicator is detected is one of the first type of objects.

2. The method of claim 1, further comprising the step of providing the surfaces to be scanned with metallized surfaces.

3. The method of claim 2, wherein the metallized surfaces comprise a visible diffraction pattern.

4. The method of claim 1, further comprising the step of recording holographic images visible to the unaided human eye in the surfaces to be scanned.

5. The method of claim 1, wherein the step of scanning with the coherent reference light comprises the step of scanning with a laser.

6. The method of claim 1, wherein the plurality of objects are game cards, and wherein the first type of objects are winning game cards.

7. The method of claim 1, wherein the plurality of objects are game cards, and wherein the covert holographic indicators provide win/lose information.

8. The method of claim 1, wherein the first type of objects are valid and the second type of objects are counterfeit.

9. A method of determining which of a plurality of objects has been marked with a covert indicator, the method comprising the steps of:

providing each of a plurality of objects with a metallized surface;

recording a covert holographic indicator in a portion of the metallized surface on at least one of the plurality of objects, the covert holographic indicator being exposed to view but not being visible to the unaided human eye except when illuminated with a coherent reference light with a predetermined wavelength;

scanning the portions of the metallized surfaces of the plurality of objects with a coherent reference light of the predetermined wavelength to reconstruct the recorded covert holographic indicator; and evaluating whether the scanned portions include the recorded covert holographic indicator.

10. The method of claim 9, further comprising the step of recording a holographic image visible to the unaided human eye in the metallized surfaces.

11. The method of claim 9, wherein the metallized surface comprises a visible diffraction pattern.

12. The method of claim 9, wherein the coherent reference light is a laser.

13. The method of claim 9, wherein the plurality of objects includes first and second type objects, and wherein only the first type of objects are coded with the covert holographic indicator.

14. The method of claim 13, wherein the plurality of objects are game cards, and wherein the first type of objects are winning game cards.

15. The method of claim 9, wherein the plurality of objects are game cards, and wherein the covert holographic indicators provide win/lose information.

16. The method of claim 9, wherein the metallized surface is provided on a paper substrate.

17. The method of claim 9, wherein the metallized surface is provided on a metal substrate.

18. A system for identifying a first type of objects from among a plurality of the first and a second type of objects which are generally visually indistinguishable, the system comprising:

means for recording a covert holographic indicator in a portion of a surface of each of first type of objects, said covert holographic indicator being exposed to view but not being visible to the unaided human eye except when illuminated with a coherent reference light with a predetermined wavelength;

means for scanning the surfaces of the first and second objects with a coherent reference light of said predetermined wavelength to reconstruct the recorded said covert holographic indicator; and means for evaluating whether the scanned surfaces include said covert holographic indicator, the presence of said covert holographic indicator indicating that a one of the objects on which said covert holographic indicator is detected is one of the first type of objects.

19. The system of claim 18, wherein the surfaces to be scanned comprise metallized surfaces.

20. The system of claim 19, wherein the metallized surfaces comprise a visible diffraction pattern.

21. The system of claim 18, wherein the surfaces to be scanned comprise holographic images visible to the unaided human eye.

22. The system of claim 18, wherein said means for scanning with a coherent reference light of said predetermined wavelength comprises a laser.

23. The system of claim 18, wherein the first type of objects are valid and the second type of objects are counterfeit.

* * * * *